(12) United States Patent
Liu (10) Patent No.: US 10,506,537 B2
(45) Date of Patent: Dec. 10, 2019

(54) TRANSCEIVER DEVICE WITH REAL-TIME CLOCK

(71) Applicant: Stichting IMEC Nederland, Eindhoven (NL)

(72) Inventor: Yao-Hong Liu, Eindhoven (NL)

(73) Assignee: Stichting IMEC Nederland, Eindhoven (NL)

( * ) Notice: Subject to any disclaimer, the term of this patent is extended or adjusted under 35 U.S.C. 154(b) by 0 days.

(21) Appl. No.: 16/209,126

(22) Filed: Dec. 4, 2018

(65) Prior Publication Data

US 2019/0200311 A1     Jun. 27, 2019

(30) Foreign Application Priority Data

Dec. 21, 2017   (EP) ..................................... 17209427

(51) Int. Cl.
*H04W 56/00* (2009.01)
*H04W 52/02* (2009.01)
*H04L 7/08* (2006.01)
*H04L 7/00* (2006.01)
*H04W 84/18* (2009.01)

(52) U.S. Cl.
CPC ....... *H04W 56/0015* (2013.01); *H04L 7/0083* (2013.01); *H04L 7/08* (2013.01); *H04W 52/028* (2013.01); *H04W 52/0216* (2013.01); *H04W 52/0235* (2013.01); *H04W 84/18* (2013.01)

(58) Field of Classification Search
CPC ......... H04W 56/0015; H04W 52/0216; H04W 52/0235; H04W 52/028; H04W 84/18; H04L 7/0083; H04L 7/08
See application file for complete search history.

(56) References Cited

U.S. PATENT DOCUMENTS

| | | | |
|---|---|---|---|
| 2003/0034887 A1* | 2/2003 | Crabtree | G01S 3/54 340/539.1 |
| 2008/0108318 A1* | 5/2008 | Min | H04W 52/0229 455/343.1 |
| 2012/0093245 A1* | 4/2012 | Makdissi | A61N 1/37288 375/259 |
| 2012/0320809 A1* | 12/2012 | Sturm | H04W 52/0235 370/311 |
| 2014/0112229 A1 | 4/2014 | Merlin et al. | |
| 2016/0150474 A1 | 5/2016 | Ang et al. | |

OTHER PUBLICATIONS

European Search Report, European Patent Application No. 17209427.8, dated Jun. 15, 2018, 6 pages.

* cited by examiner

*Primary Examiner* — Janice N Tieu
(74) *Attorney, Agent, or Firm* — McDonnell Boehnen Hulbert & Berghoff LLP (57) ABSTRACT

Example embodiments relate to transceiver devices with real-time clocks. One embodiment includes a transceiver device. The transceiver device includes a real-time clock arranged for providing a clock signal. The transceiver device also includes a receiving section. The receiving section includes a main receiver arranged for receiving communication signals. The receiving section also includes a wake-up receiver. The wake-up receiver is arranged for receiving a calibration signal that includes clock timing information containing a time stamp. The wake-up receiver is also arranged for adjusting the real-time clock based on the clock timing information.

20 Claims, 6 Drawing Sheets

TRANSCEIVER DEVICE WITH REAL-TIME CLOCK

CROSS-REFERENCE TO RELATED APPLICATIONS

The present application is a non-provisional patent application claiming priority to European Patent Application No. EP 17209427.8, filed Dec. 21, 2017, the contents of which are hereby incorporated by reference.

FIELD OF THE DISCLOSURE

The present disclosure is generally related to the field of sensor networks.

BACKGROUND

Most data collected by sensor nodes which for example form a wireless sensor network, changes very slowly. Consequently, in many applications most data needs to be transmitted only once every few minutes or even every few hours.

Sensor nodes typically include a transmitter/receiver structure (i.e. a transceiver), a sensor, a sensor interface, an energy source like e.g. a battery and a controller. The sensor and the energy source may be integrated in the sensor node or be external to it.

There is a clear tendency towards the use of batteries with an ever increasing lifetime. To meet the tough goal of a 10-year battery life time with a one-time installation or energy harvest operation, a radio-frequency (RF) transceiver (which is by far the most power-hungry block in a sensor network) should have an extremely low duty cycle (i.e., the ratio of on-time to sleep time), to minimize the average power consumption. For example, the average power consumption of the RF transceiver should be lower than 1 μW in order to sustain for 10 years with a 100 mAh small battery.

There are two key limiting factors for reaching a minimum average power consumption and duty cycle: leakage current and the accuracy of the real-time counter. To address the leakage issue, a sophisticated power management and non-volatile memory have been widely explored. However, the real-time-counter accuracy has so far received little attention. If the real-time-counter has a frequency error of 1%, the lowest duty cycle is also limited to approximately 1%, because the transceiver needs to be enabled longer in order not to lose synchronization. For a transceiver with 10 mW peak power, the duty cycle need to be reduced to $10^{-5}$ to achieve an average power below 1 μW, this requires the real-time-counter accuracy to be approximately 10 ppm, i.e., an accuracy similar to that of a crystal oscillator (XO). Note the low-power RC-based real-time-counter typically has an accuracy in the order of 10000 ppm.

Further reducing the duty cycle does not lead to a reduction of the average power either when the settling time of the main crystal oscillator or the system processing overhead becomes a dominant factor.

In the art the use of a high precision external temperature compensated crystal oscillator has been proposed. Such a temperature-compensated XO may consume as much as 10 μA, i.e. 100 times more than an on-chip relaxation oscillator. An important drawback is that such a technique may be very expensive.

If a crystal oscillator is used to calibrate the real-time-counter, only the frequency offset is calibrated, but not the noise, temperature, or supply voltage induced variation.

Also in case the frequency is synchronized in the network level, only frequency drift is calibrated, but not the noise induced variation.

Hence, there is a need for a synchronization method which is ultra-low power in order to enable a long operation life time or energy harvesting based operation.

SUMMARY

Embodiments of the present disclosure provide for a transceiver device that includes a mechanism for accurate wake-up timing. Having such a transceiver device available is an important step towards establishing ultra-low power synchronization in a sensor network. The present disclosure also provides for a method for calibrating such a transceiver device.

The above is accomplished according to the present disclosure.

In a first aspect, the present disclosure relates to a transceiver device that includes a real-time clock arranged for providing a clock signal and a receiving section that includes:
 a main receiver arranged for receiving communication signals,
 a wake-up receiver arranged for receiving a calibration signal that includes clock timing information containing a time stamp and for adjusting the real-time clock based on the clock timing information.

The proposed technique indeed allows for receiving in the wake-up receiver a calibration signal on a regular basis, so that network synchronization becomes possible with reduced power consumption and cost.

In some embodiments, the wake-up receiver is arranged for receiving a wake-up signal and for waking up the main receiver upon reception of the wake-up signal.

In other embodiments, the real-time clock is arranged for waking up the main receiver.

In other embodiments, the wake-up receiver is arranged for being enabled periodically via the clock signal from the real-time clock.

The receiving section may include a real-time clock controller arranged to receive the clock timing information from a transceiver device acting as a master and to compare the received clock timing information with timing information of the real-time clock to obtain a timing error for adjusting the real-time clock of the transceiver device. The real-time clock controller includes a counter to extract the timing information of the real-time clock.

The transceiver device includes, in certain embodiments, comparing means to perform the comparing of the received clock timing information and the timing information of the real-time clock.

In one embodiment, the real-time clock controller further includes a digital loop filter to filter the timing error.

In some embodiments, the transceiver device further includes a sensor device.

In another aspect, the present disclosure relates to a device for use as a sensor node in a sensor network that includes a transceiver device as previously described.

In one aspect, the present disclosure relates to a communication system that includes one or more transceivers as previously described.

In some embodiments, the communication system may include a further transceiver arranged to act as a master device.

In another aspect, the present disclosure relates to a method for calibrating a real-time clock of a first transceiver device operative as a slave in a network, the method includes:
- enabling a wake-up receiver forming part of a receiving section of the first transceiver device,
- receiving in the wake-up receiver a calibration signal that includes clock timing information containing a time stamp and adjusting the real-time clock based on the clock timing information.

In embodiments of the method, a main receiver forming part of the receiving section of the first transceiver device is woken up with the wake-up receiver, once the calibration signal has been received.

In certain embodiments, the wake-up receiver is periodically enabled via a clock signal from the real-time clock.

For purposes of summarizing the present disclosure, certain objects of the disclosure have been described herein above. Of course, it is to be understood that not necessarily all such objects may be achieved in accordance with any particular embodiment of the disclosure. Thus, for example, those skilled in the art will recognize that the disclosure may be embodied or carried out in a manner that achieves or optimizes one advantage or group of advantages as taught herein without necessarily achieving other objects as may be taught or suggested herein.

The above and other aspects of the present disclosure will be apparent from and elucidated with reference to the embodiment(s) described hereinafter.

BRIEF DESCRIPTION OF THE DRAWINGS

The present disclosure will now be described further, by way of example, with reference to the accompanying drawings, wherein like reference numerals refer to like elements in the various figures.

DETAILED DESCRIPTION

The present disclosure will be described with respect to particular embodiments and with reference to certain drawings but the disclosure is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the disclosure described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising A and B" should not be limited to devices consisting only of components A and B. It means that with respect to the present disclosure, the only relevant components of the device are A and B.

Reference throughout this specification to "one embodiment" or "an embodiment" means that a particular feature, structure or characteristic described in connection with the embodiment is included in at least one embodiment of the present disclosure. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of example embodiments of the disclosure, various features of the disclosure are sometimes grouped together in a single embodiment, figure, or description thereof for the purpose of streamlining the disclosure and aiding in the understanding of one or more of the various aspects. This method of disclosure, however, is not to be interpreted as reflecting an intention that the claimed disclosure requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those in the art. For example, in the following claims, any of the claimed embodiments can be used in any combination.

It should be noted that the use of particular terminology when describing certain features or aspects of the disclosure should not be taken to imply that the terminology is being re-defined herein to be restricted to include any specific characteristics of the features or aspects of the disclosure with which that terminology is associated.

In the description provided herein, numerous specific details are set forth. However, it is understood that embodiments of the disclosure may be practiced without these specific details. In other instances, well-known methods, structures, and techniques have not been shown in detail in order not to obscure an understanding of this description.

In order to allow for low power synchronization the present disclosure discloses a transceiver device with a novel structure as well as a method for calibrating such a transceiver device when it is part of a network.

Figure 1:
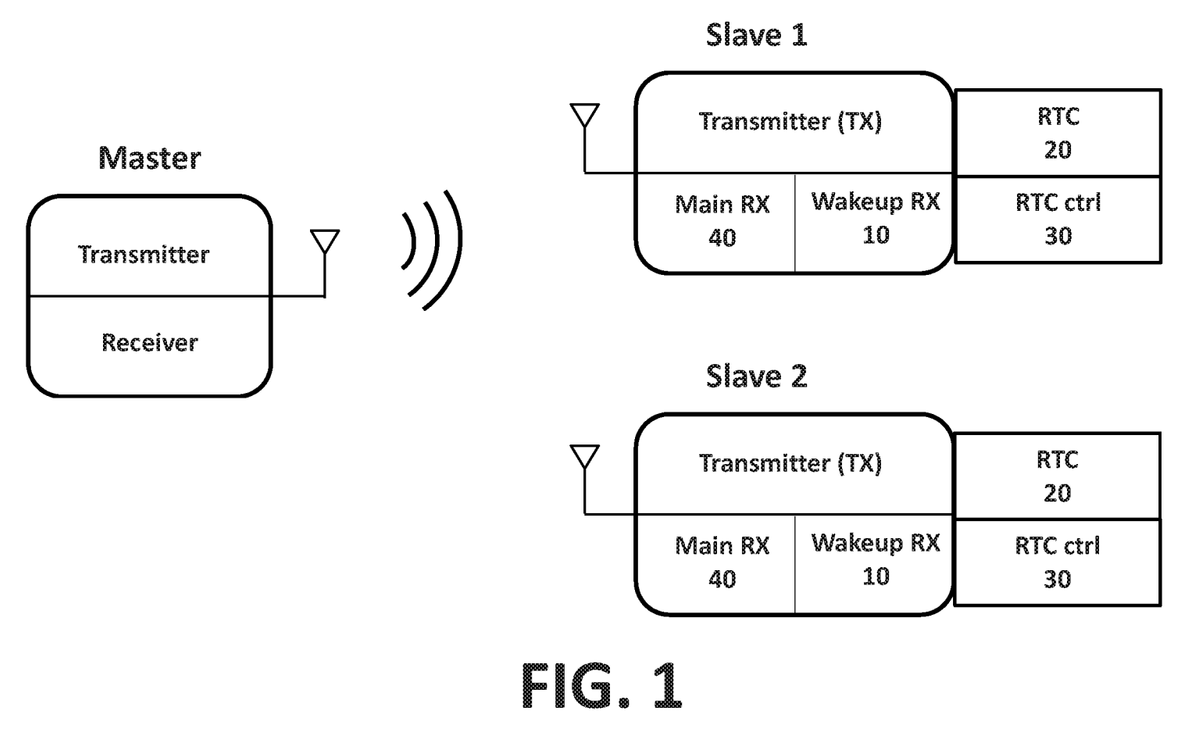
FIG. 1 illustrates a network structure with a master transceiver and slave transceivers, according to example embodiments.

To explain the present disclosure, an example network structure as illustrated in FIG. 1 is considered. A network of wireless nodes is shown. One wireless transceiver is used as a master node. Two more transceiver devices are shown that act as a slave node. Apart from the transmitter section and the receiver section each of the slave devices is provided with a real-time clock 20.

According to the present disclosure, the transceiver devices acting as slave have a receiving section that not only includes a main receiver 40 that can receive communication signals, but also includes a wake-up receiver 10. The present disclosure also unveils a calibration method in which this wake-up receiver performs a role.

Figure 2:
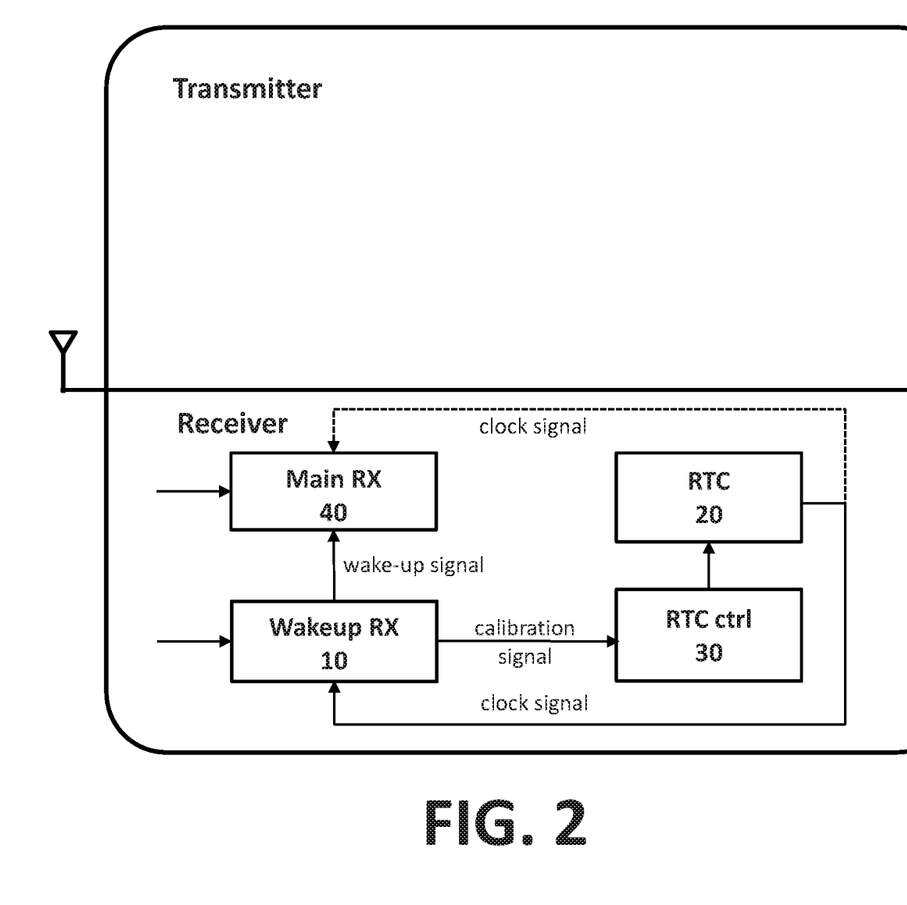
FIG. 2 illustrates a block scheme of a transceiver, showing the main blocks of the receiving section, according to example embodiments.

A more detailed view of the high level architecture of the transceiver of this disclosure is provided in FIG. 2. In some embodiments of the disclosure, the wake-up receiver (WuRX) 10 is periodically enabled by the clock signal of the real-time counter (RTC) 20. Note that in this description the terms "real-time counter" and "real-time clock" refer to the same and are used interchangeably. Once enabled, the wake-up receiver is ready to receive from the master node a calibration signal containing clock timing information and/ or wake-up signal. As illustrated in FIG. 2, the receiving section also includes a real-time clock controller 30, which receives the clock timing information received from the master device.

Based on the received clock timing information, the slave device can then correct the clock signal of the real-time counter, as will be detailed below. The transmitter in the master node employs a precise crystal oscillator to generate a correct timing reference. It periodically transmits the calibration signal with the timing information, including a time stamp, to the slave devices. The precise crystal oscillator in the master node is further also used to generate a stable signal center frequency.

Alternatively, the wake-up receiver is continuously enabled. In this way the wake-up is, at any time, ready to listen to an incoming calibration signal.

However, the present disclosure will be described below with reference to the periodically enabled wake-up receiver.

In one embodiment, the wake-up receiver wakes up the main receiver in the receiving section of the slave transceiver device once the wake-up signal is received. This reduces the on time of the main receiver. The wake-up signal is sent just before the master node transmits a communication signal to the slave node.

In other embodiments the main receiver is woken up directly via a clock signal from the real-time counter (RTC) 20. This is illustrated with a dashed line in FIG. 2.

Figure 3:
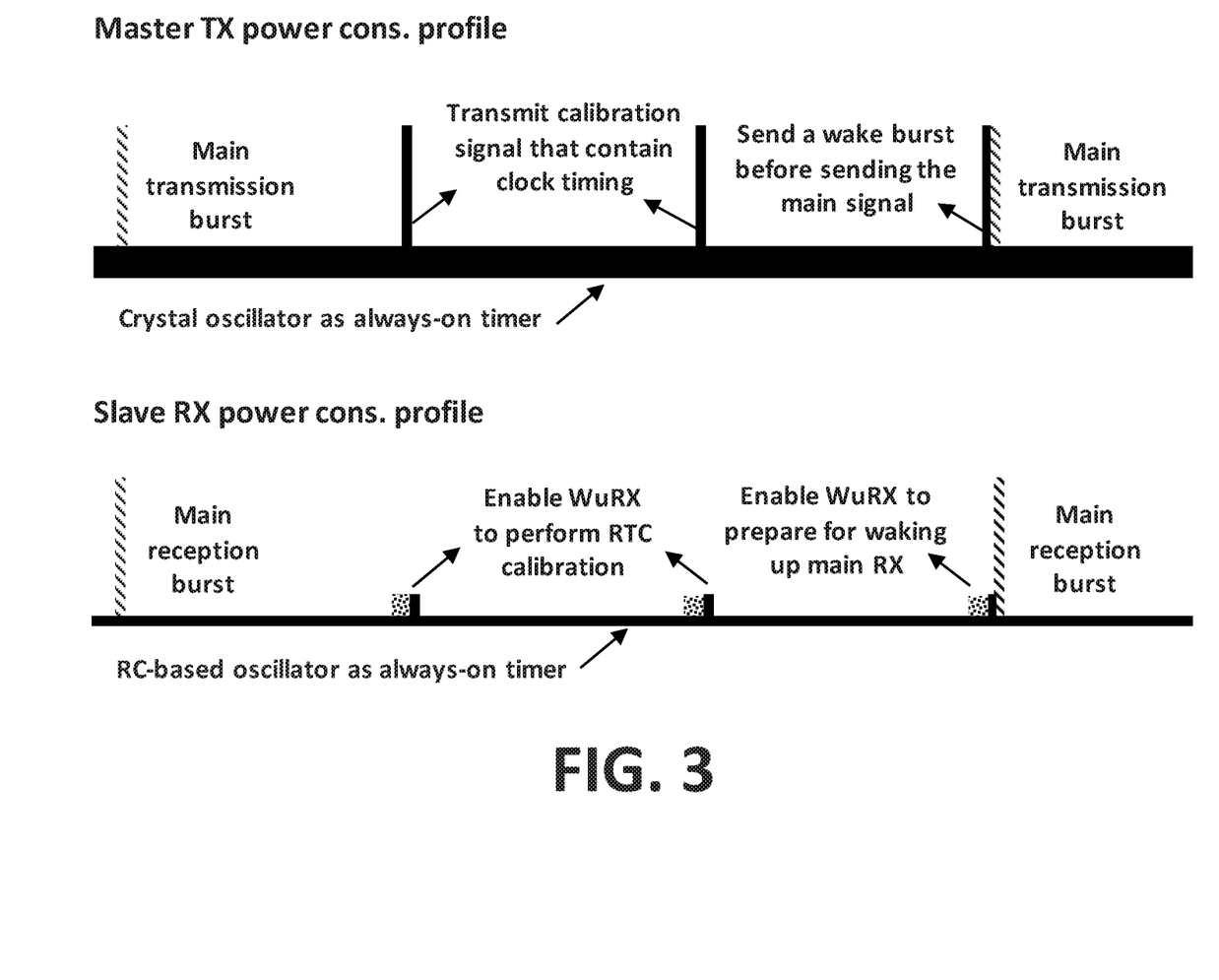
FIG. 3 illustrates a communication scheme that can be used with the network structure of FIG. 1, according to example embodiments.

FIG. 3 illustrates a typical communication scheme. At regular times, the wake-up receiver in the slave device is enabled. It can then receive the calibration signal that contains the clock timing information. FIG. 3 also illustrates a second calibration signal transmission and a third signal—a wake-up signal—transmission. The wake-up signal transmission occurs just before transmitting the main burst signal.

Figure 4:
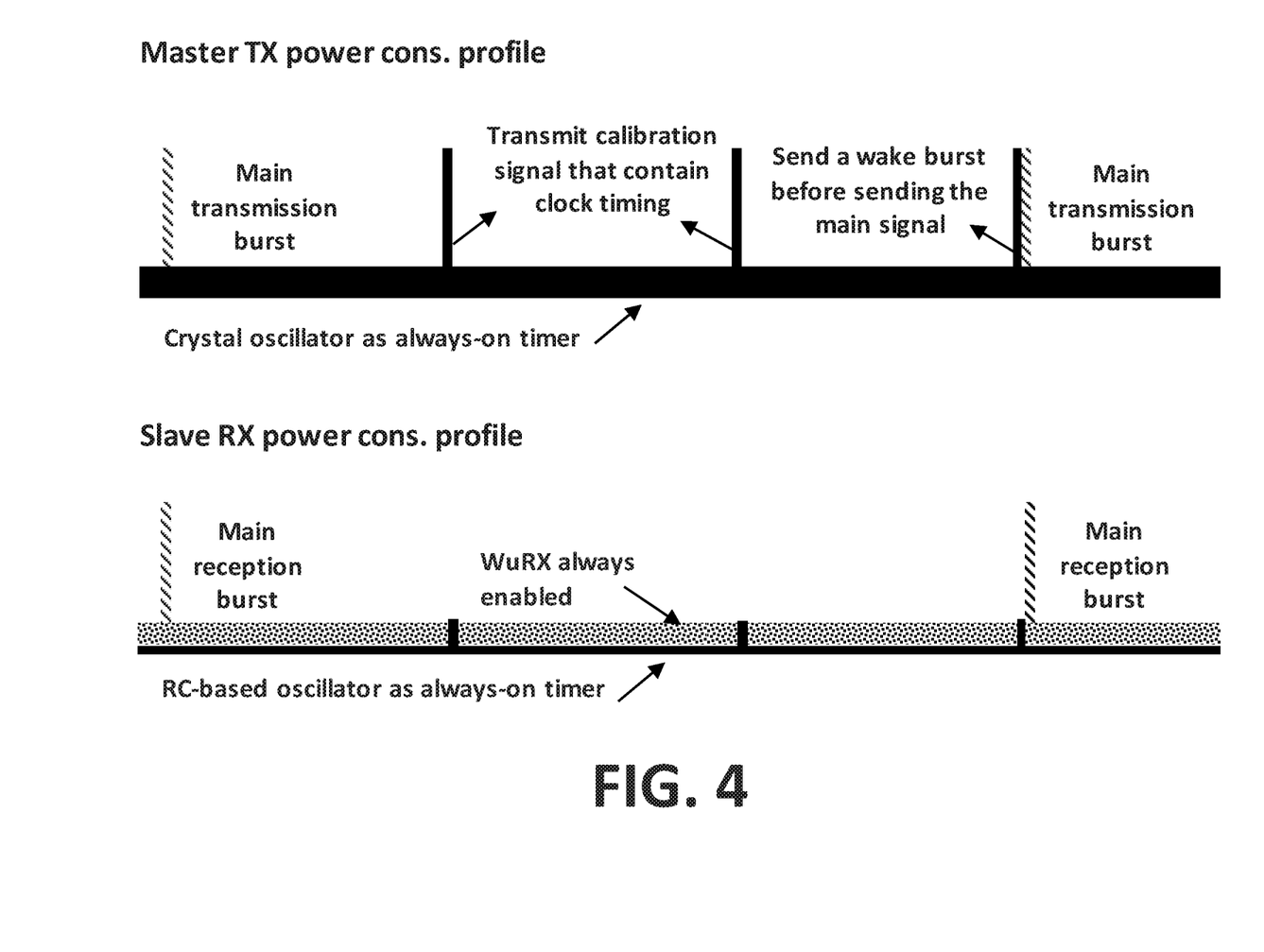
FIG. 4 illustrates another communication scheme, wherein the wake-up receiver is continuously enabled, according to example embodiments.

FIG. 4 provides a similar scheme as FIG. 3, but now for the case the wake-up receiver is continuously enabled. The wake-up receiver is then all the time ready for receiving a calibration signal containing clock timing information.

Figure 5:
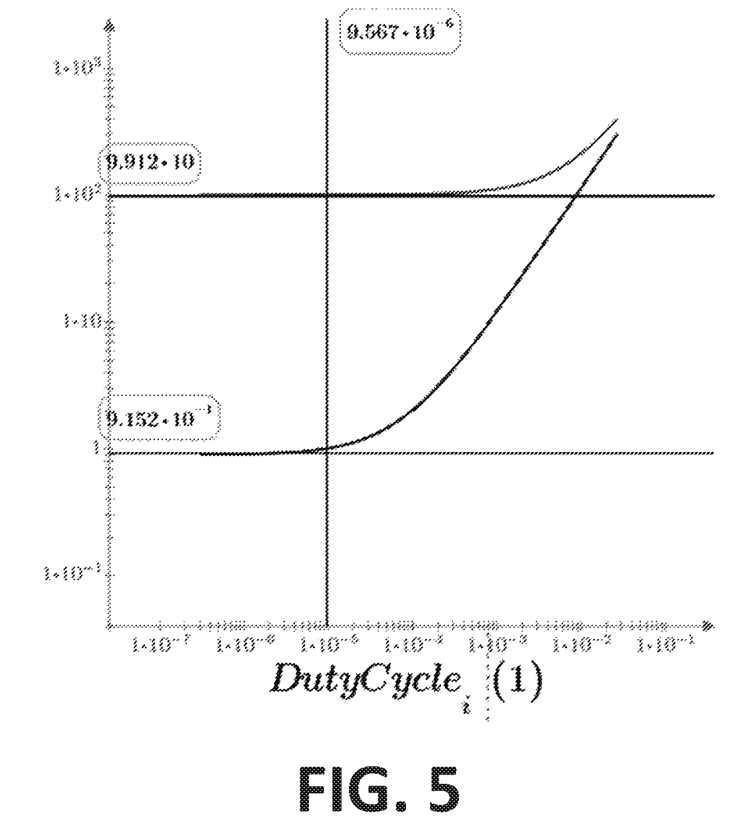
FIG. 5 illustrates a clock duty cycle reduction that can be achieved with the transceiver device of the present disclosure, according to example embodiments.

The proposed approach regulates the real-time clock accuracy to a similar level as a crystal oscillator, i.e., from 10,000 ppm to 10 ppm, without increasing the power consumption of the slave node as in the case a crystal oscillator is used instead. The wake-up receiver itself consumes very low power and is only enabled for a short period of time. FIG. 5 illustrates the calculated average power consumption (in µW) versus duty cycle. The upper curve is calculated based on a typical real-time clock with calibration, whereas the lower curve is calculated based on a real-time clock calibrated as proposed in this disclosure. As illustrated in FIG. 5, the average power consumption with a real-time clock without calibration is limited to around 10 µW, even the duty cycle is reduced to below $10^{-5}$. On the other hand, when the real-time clock is being calibrated to an accuracy of 10 ppm, it brings down the average power consumption of the slave node to 0.9 µW when the clock duty cycle is reduced to $10^{-5}$.

Figure 6:
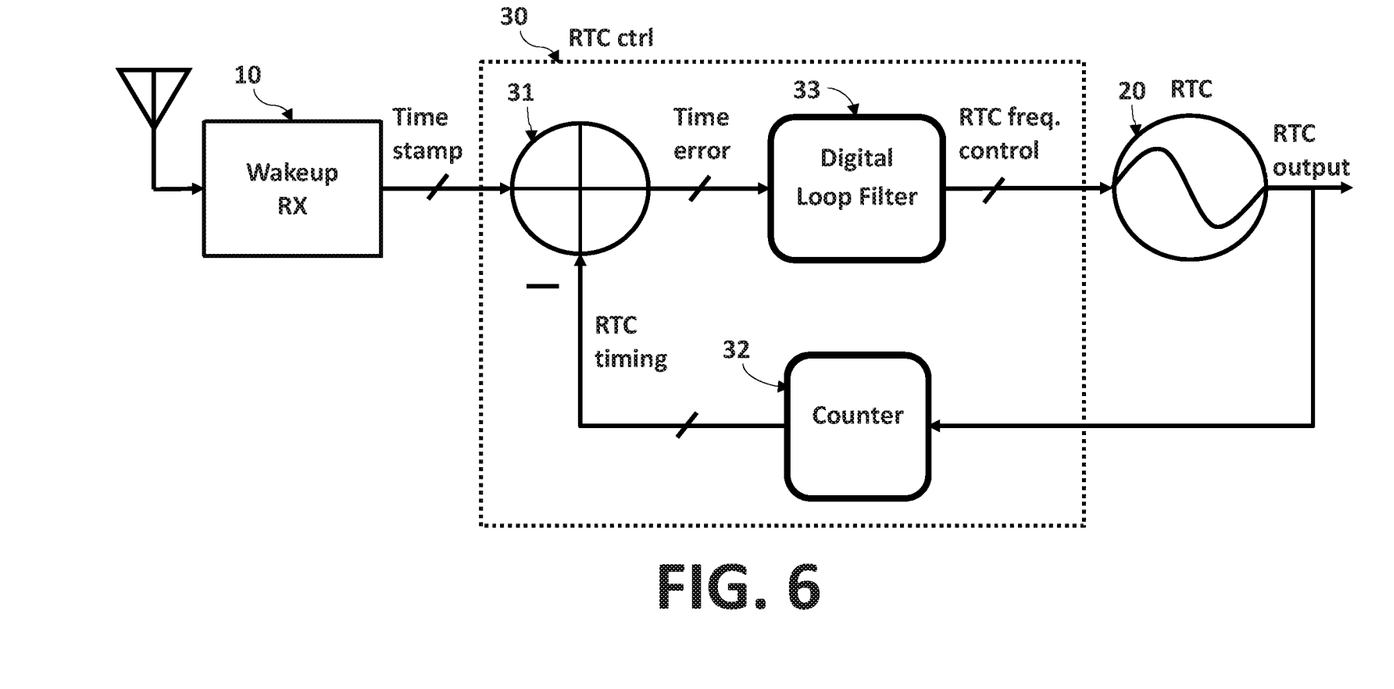
FIG. 6 illustrates a block scheme illustrating the calibration and clock correction, according to example embodiments.

Details on the calibration and the real-time clock correction are now provided with reference to the block scheme of FIG. 6. The wake-up receiver receives, via its antenna, the calibration signal that includes a time stamp. FIG. 6 provides a more detailed view on the real-time clock controller that receives the clock timing information from the master device. The real-time controller is further arranged for comparing this information with timing information derived from the real-time clock included in the slave transceiver. As also shown in FIG. 6, the controller includes a counter to extract real-time information from the real-time clock output of the slave device. The controller then can determine a timing error by comparing the received clock timing information, i.e. the time stamp contained therein, with timing information of the real-time clock.

In some embodiments, a digital loop filter is provided to filter the timing error.

It is to be noted that the above presented approach can be applied in a similar fashion to provide a stable signal center frequency without requiring a crystal oscillator at the slave node.

Many wireless sensor networks use a "synchronous" network structure. In this kind of synchronous network there is a master node as the control center that organizes the communication with one or more slave devices. These slave devices, which typically include sensors, collect the environmental information to send it to the master node. In such a network structure, the master node periodically sends control information (or a beacon signal) and the slave nodes need to wake up periodically to receive this control information and possibly send back the sensor data to the master node if that is needed. To make sure these slave nodes do not miss the signal containing control information from the master, they need to wake up at the right time. Otherwise, they need to turn on much earlier in order not to miss the control signal, which causes unnecessary energy waste. With the presented disclosure, the slave nodes can wake up at the correct time because the real-time clock precision is being calibrated.

Similarly to the abovementioned wireless sensor network, many wireless communication networks also use a similar master-slave network structure. For example, the base-station of a cellular system is equivalent to a master and the cell phones are the slave devices. The receivers of the cell phones need to periodically turn on to receive the control information from the base station. To extend the battery lifetime of the cell phones, a similar approach can be adopted to ensure the wake-up timing of the cell phones are precisely calibrated.

While the present disclosure has been illustrated and described in detail in the drawings and foregoing description, such illustration and description are to be considered illustrative or as examples and not restrictive. The foregoing description details certain embodiments of the disclosure. It will be appreciated, however, that no matter how detailed the foregoing appears in text, the disclosure may be practiced in many ways. The disclosure is not limited to the disclosed embodiments.

Other variations to the disclosed embodiments can be understood and effected by those skilled in the art in practicing the claimed disclosure, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

What is claimed is:

1. A transceiver device comprising:
a real-time clock arranged for providing a clock signal;
a receiving section comprising:
  a main receiver arranged for receiving communication signals; and
  a wake-up receiver arranged for:
    receiving a calibration signal comprising clock timing information containing a time stamp; and
    adjusting the real-time clock based on the clock timing information; and
a real-time clock controller arranged to:
  receive the clock timing information; and
  compare the received clock timing information with timing information of the real-time clock to obtain a timing error for adjusting the real-time clock.

2. The transceiver device of claim 1, wherein the wake-up receiver is further arranged for:
receiving a wake-up signal; and
waking up the main receiver upon reception of the wake-up signal.

3. The transceiver device of claim 1, wherein the real-time clock is further arranged for waking up the main receiver.

4. The transceiver device of claim 1, wherein the wake-up receiver is further arranged to be periodically enabled via the clock signal from the real-time clock.

5. The transceiver device of claim 1, wherein the wake-up receiver is continuously enabled.

6. The transceiver device of claim 1, wherein the real-time clock controller comprises a counter to extract the timing information of the real-time clock.

7. The transceiver device of claim 1, further comprising a processor arranged to compare the received clock timing information and the timing information of the real-time clock.

8. The transceiver device of claim 1, wherein the real-time clock controller comprises a digital loop filter to filter the timing error.

9. The transceiver device of claim 1, further comprising a sensor device.

10. The transceiver device of claim 1, wherein the transceiver device is a sensor node in a sensor network.

11. The transceiver device of claim 1, wherein the transceiver device is a component of a communication system.

12. The transceiver device of claim 11, wherein the communication system comprises a transceiver arranged to act as a master device.

13. A method for calibrating a real-time clock of a first transceiver device operative as a slave in a network, the method comprising:
enabling a wake-up receiver that forms part of a receiving section of the first transceiver device;
receiving, by the wake-up receiver, a calibration signal comprising clock timing information containing a time stamp;
adjusting, by the wake-up receiver, the real-time clock based on the clock timing information;
receiving, by a real-time clock controller, the clock timing information; and
comparing, by the real-time clock controller, the received clock timing information with timing information of the real-time clock to obtain a timing error for adjusting the real-time clock.

14. The method of claim 13, wherein, once the calibration signal is received, a main receiver that forms part of the receiving section of the first transceiver device is woken up with the wake-up receiver.

15. The method of claim 13, wherein the wake-up receiver is periodically enabled via a clock signal from the real-time clock.

16. A communication system comprising:
a transceiver device comprising:
  a real-time clock arranged for providing a clock signal; and
  a receiving section comprising:
    a main receiver arranged for receiving communication signals; and
    a wake-up receiver arranged for:
      receiving a calibration signal comprising clock timing information containing a time stamp; and
      adjusting the real-time clock based on the clock timing information; and
    a real-time clock controller arranged to:
      receive the clock timing information; and
      compare the received clock timing information with timing information of the real-time clock to obtain a timing error for adjusting the real-time clock.

17. The communication system of claim 16 further comprising a transceiver arranged to act as a master device.

18. The communication system of claim 16, wherein the wake-up receiver is further arranged for:
receiving a wake-up signal; and
waking up the main receiver upon reception of the wake-up signal.

19. The communication system of claim 16, wherein the real-time clock is further arranged for waking up the main receiver.

20. The communication system of claim 16, wherein the wake-up receiver is further arranged to be periodically enabled via the clock signal from the real-time clock.

* * * * *